US008484286B1

(12) United States Patent
Kornafeld et al.

(10) Patent No.: US 8,484,286 B1
(45) Date of Patent: Jul. 9, 2013

(54) METHOD AND SYSTEM FOR DISTRIBUTED COLLECTING OF INFORMATION FROM A NETWORK

(75) Inventors: Adam Kornafeld, Nyíregyháza (HU); Jozsef Patvarczki, Framingham, MA (US); Endre Tomas, Worcester, MA (US); Zoltan Farkas, Nagykanizsa (HU)

(73) Assignee: Hydrabyte, Inc, Worcester, MA (US)

( * ) Notice: Subject to any disclaimer, the term of this patent is extended or adjusted under 35 U.S.C. 154(b) by 0 days.

(21) Appl. No.: 12/618,848

(22) Filed: Nov. 16, 2009

(51) Int. Cl.
*G06F 15/16* (2006.01)

(52) U.S. Cl.
USPC ........... 709/203; 709/219; 709/223; 709/248; 707/709

(58) Field of Classification Search
USPC ............... 709/203, 217, 219, 223, 248, 706, 709/709; 707/706, 999.01
See application file for complete search history.

(56) References Cited

U.S. PATENT DOCUMENTS

| | | | | |
|---|---|---|---|---|
| 7,512,859 B2* | 3/2009 | Flynn et al. | ................... | 714/746 |
| 2003/0208563 A1* | 11/2003 | Acree et al. | ................... | 709/219 |
| 2005/0015466 A1* | 1/2005 | Tripp | .......................... | 709/219 |
| 2005/0086206 A1* | 4/2005 | Balasubramanian et al. | .... | 707/3 |
| 2006/0143160 A1* | 6/2006 | Vayssiere | .......................... | 707/3 |
| 2007/0138254 A1* | 6/2007 | Frendo et al. | ................. | 235/375 |
| 2008/0059486 A1* | 3/2008 | Pappas | .......................... | 707/100 |
| 2008/0114739 A1* | 5/2008 | Hayes | .................................. | 707/3 |
| 2009/0248693 A1* | 10/2009 | Sagar et al. | ..................... | 707/10 |
| 2009/0319342 A1* | 12/2009 | Shilman et al. | ................. | 705/10 |
| 2010/0073701 A1* | 3/2010 | Okada et al. | ................. | 358/1.13 |
| 2010/0114859 A1* | 5/2010 | Li et al. | ......................... | 707/709 |
| 2010/0145923 A1* | 6/2010 | Wang et al. | ................... | 707/708 |
| 2010/0169301 A1* | 7/2010 | Rubanovich et al. | ......... | 707/709 |
| 2011/0153587 A1* | 6/2011 | Murugan | ...................... | 707/706 |

* cited by examiner

*Primary Examiner* — Oanh Duong
(74) *Attorney, Agent, or Firm* — Altman & Martin; Steven K Martin

(57) ABSTRACT

A method and system for collecting the contents of a computer network. There is a single Data Store, one or more Address Dispatchers, and Data Fetchers. A Fetcher requests a network site address from a Dispatcher, collects information from that site, and sends it to the Data Store. A Central Dispatcher retrieves usable addresses from the information stored in the Data Store. Deployed Dispatchers receive addresses from the internal database of a Network Hosting Service Provider (NHSP). A Global Fetcher resides anywhere on the network. A Deployed Fetcher resides on a dedicated resource within an NHSP. A Community Fetcher resides on a private personal computer that has relatively continuous access to the network, collecting only textual information, thereby producing relatively little network traffic. As a consequence, the Community Fetcher can run in the background, leading to the use of multitudes of volunteers, each running a Community Fetcher.

6 Claims, 2 Drawing Sheets

METHOD AND SYSTEM FOR DISTRIBUTED COLLECTING OF INFORMATION FROM A NETWORK

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to network search engines, more particularly, to a method for collecting, compiling, and updating a data in a database for use by a search engine on a computer network.

2. Description of the Related Art

Compiling information from a computer network, particularly the Internet, is a difficult task because of the size and the characteristics of the network. The amount of data grows very rapidly and because the network sites are continuously changing, the compiled information can be considered volatile. In addition to this, there are also a number of different information-bearing file types including, for example, image files, document files, audio files, and video files, that makes discovering information a difficult task.

The current, most widely used generic solution for compiling information from a network is known as crawling and involves simply visiting a set of known sites, analyzing and indexing the content of those sites, and checking the sites for other site references. Any new site references are added to the set of known sites. Crawling is considered to be a "brute force" method.

Crawling has a number of drawbacks. First, if the crawler has only a single processing node, there is only a single point of entry from where the network is examined, so the examination cannot be expanded efficiently. Second, expanding such a system to increase the number of entry points necessitates adding processing nodes, rendering it more error- and attack-prone. The increase in the number of processing nodes also necessitates some kind of information exchange among the processors in order to avoid multiple processors visiting the same site simultaneously.

Third, crawling is not capable of discovering secluded islands, that is, sites or groups of sites that are not referenced externally, rendering them invisible to the crawler.

The result of such a crawler is merely an excerpt of the data available on the network that can be used to create search and recommendation systems that harness the compiled data to provide value-added services.

BRIEF SUMMARY OF THE INVENTION

An object of the present invention is to provide a method and system of collecting data from a network that decentralizes the task of collecting data and making it easily expandable.

The present invention is a method and system for collecting the contents of any computer network. The task of collecting information, but not compiling the information, is distributed. The system consists of a single Data Store, one or more Address Dispatchers, and one or more Data Fetchers. Briefly, a Fetcher collects information from a network site at an address received from a Dispatcher in response to a request for an address. The information is then sent to the Data Store. The Dispatchers retrieve usable addresses from the information stored in the Data Store or other sources.

There are two types of Dispatchers, a Central Dispatcher and Deployed Dispatchers. The Central Dispatcher processes the information sent to the Data Store from the Fetchers and extracts any previously unknown addresses. Deployed Dispatchers, rather than extracting addresses from the Data Store, receive addresses from the internal database of a Network Hosting Service Provider (NHSP) that provides site hosting services. A system may have both a Central Dispatcher and Deployed Dispatchers.

There are at least three possible types of Fetchers, a Global Fetcher, a Community Fetcher, and a Deployed Fetcher. A Global Fetcher resides anywhere on the network and receives addresses from the Central Dispatcher or a Deployed Dispatcher. A Deployed Fetcher resides on a dedicated resource within an NHSP and typically receives addresses only from a Deployed Dispatcher. A Community Fetcher resides on a private personal computer or similar product that has relatively continuous access to the network and receives addresses from the Central Dispatcher. The Community Fetcher only collects textual information from a site, thereby producing relatively little network traffic. As a consequence, the Community Fetcher can run in the background, leading to one implementation of the present invention, that of using multitudes of volunteers, each running a Community Fetcher.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
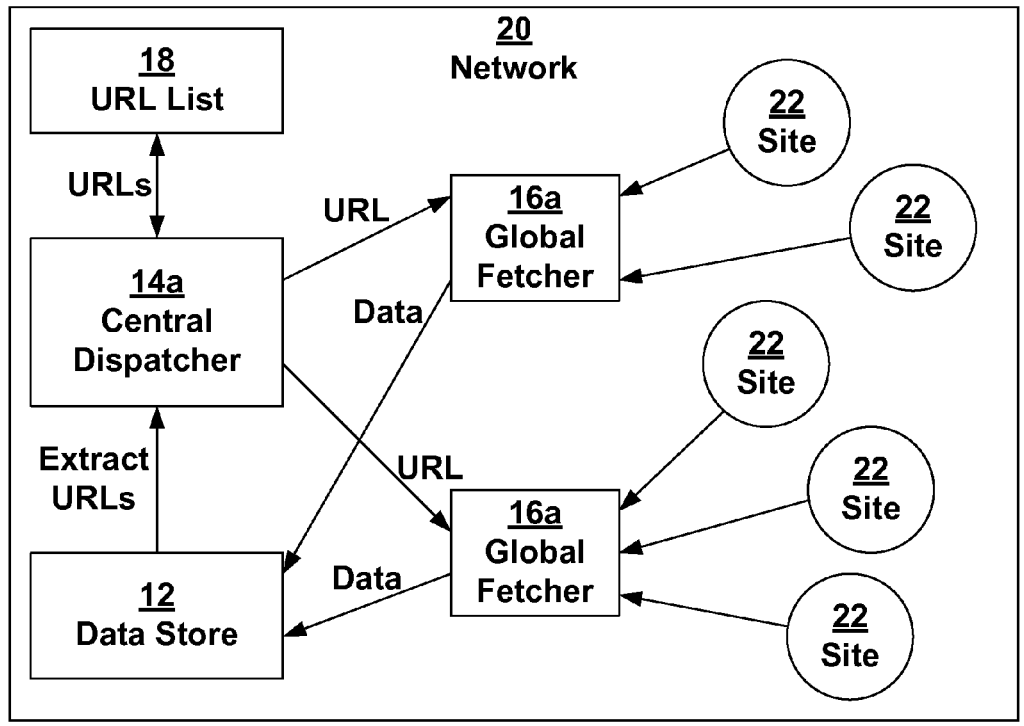
FIG. 1 illustrates a basic system implementing the method of the present invention.

The present invention is a method and system for collecting the contents of a computer network by decentralizing the task of collecting information but not the task of compiling the collected information. The present invention can be adapted to any computer network 20, including the Internet, and can be used to create an efficient, community-based, network data collection system as opposed to typical crawler systems.

The system 10 of the present invention consists of three basic elements shown in the figures: a Data Store 12, one or more Address Dispatchers 14a, 14b (collectively, 14), and one or more Data Fetchers 16a, 16b, 16c (collectively, 16). Briefly, the Fetchers 16 collect information from networks sites 22 at addresses received from the Dispatchers 14. The Dispatchers 14 retrieve usable addresses from the information stored in the Data Store 12 or other sources, as described below.

A network site 22 as used by the present invention can be a single page on the network or a group of connected or related pages. The address is the means by which a site 22 on the network that contains data is reached or found. The present invention contemplates that an address can take a number of different forms depending on the network. In the Internet, the addresses typically take the form of Uniform Resource Locators (URLs). They include a protocol, host name or IP address, and file or program pathname. The term "address" in the present specification refers to whatever method of locating data is used for the network.

A network site 22 as used by the present invention can be a single page on the network or a group of connected or related pages.

The Data Store 12 is the data base where the information collected from the network by the Fetchers 16 is stored. If desired, the data is organized as necessary for searching, analyzing, retrieving, or any other use of the information. Many different methods of organization are known in the art.

The Data Store 12 can be a single location or it can be distributed amongst a number of locations. Several reasons for distributing the Data Store 12 are increased storage capacity, redundancy, and security.

The Data Store 12 can serve as the data source for recommendation and search engine services. The information stored in the Data Store 12 can be analyzed using any information processing technology. The metadata gained from processing of the raw data in the Data Store 12 provides all the necessary information to serve as the basis of recommendation and search engine services.

The Dispatcher 14 is responsible for providing site addresses to the Fetchers 16. The present invention contemplates two types of Dispatchers 14, a Central Dispatcher 14a and Deployed Dispatchers 14b. The Central Dispatcher 14a processes the information stored in the Data Store 12 and extracts any previously unknown addresses. Alternatively, information collected by the Fetchers 16 passes through the Central Dispatcher 14 for address extraction before reaching the Data Store 12.

The extracted addresses are stored in a list in memory 18, rather than on disk, so that they can be accessed very quickly. Since the address list is in memory 18, any time the Central Dispatcher 14 is shut down, the list, which can include millions of addresses, is lost. Therefore, the Central Dispatcher 14 optionally stores the list on a hard drive or other more permanent storage prior to shutting down and restores the list in memory on startup. Optionally, the Central Dispatcher 14 periodically backs up the current list on a hard drive in the event of a catastrophic failure.

The Central Dispatcher 14 can be distributed among a number of processors to increase the throughput of the system.

The Fetchers 16 request addresses from the Dispatcher 14 following the data-pull model. The Dispatcher 14 either forwards an address or set of addresses to the Fetcher 16 or denies the request. A request may be denied if, for example, the requesting Fetcher 16 is unknown or there is a problem with the system that must be repaired before address requests can be serviced or someone has taken control of a Fetcher 16 and is trying to hack into the system. Since a Fetcher 16 is inoperable without addresses from the Dispatcher 14, the entire information collecting system is managed from a central location.

Figure 2:
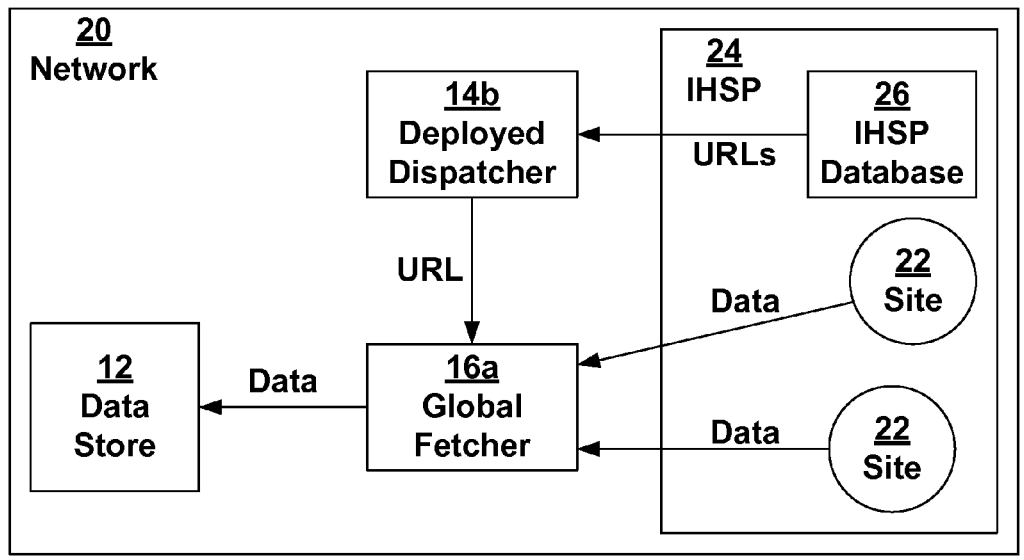
FIG. 2 illustrates an implementation with Deployed Dispatcher and a Global Fetcher.
Figure 3:
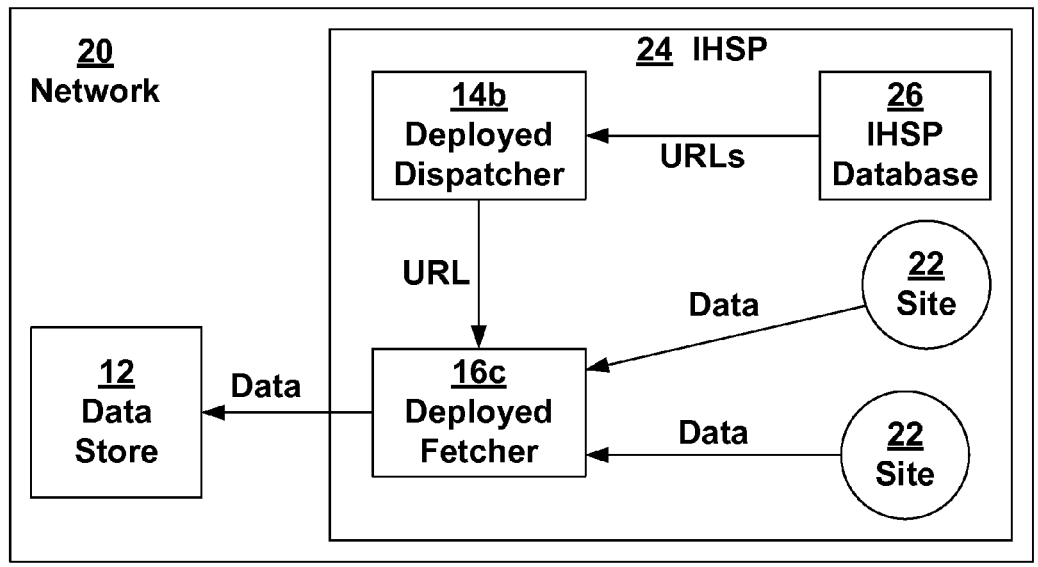
FIG. 3 illustrates an implementation with a Deployed Dispatcher and a Deployed Fetcher.

Deployed Dispatchers 14b typically only differ from the Central Dispatcher 14a by the source of new addresses. As described above, the Central Dispatcher 14a extracts addresses from the information collected by the Fetchers 16. A Deployed Dispatcher 14b receives addresses from the internal database 26 of a Network Hosting Service Provider (NHSP) 24, as shown in FIGS. 2 and 3. An NHSP 24 provides network site hosting services allowing organizations and individuals to serve content to the network, such as through a Web site on the Internet. The Deployed Dispatcher 14b may be outside of the NHSP 24, as in FIG. 2, or resident in the NHSP 24, as shown in FIG. 3. With a Deployed Dispatcher 14b distributing addresses, a Fetcher 16 will only visit sites 22 hosted by the NHSP 24. The present invention contemplates that a Central Dispatcher 14a and Deployed Dispatchers 14b can exist simultaneously in a system 10, for example, when some but not all NHSPs 24 in the network permit resident Deployed Dispatchers 18. In such a scenario, there are several methods for avoiding duplicate addresses. In one, the Deployed Dispatcher 14b sends the addresses to the Central Dispatcher 14a and all Fetchers 16 receive addresses from the Central Dispatcher 14a only. In another, the Central Dispatcher 14a and Deployed Dispatchers 14b are synchronized to reduce or eliminate duplicate addresses.

The Fetcher 16 simplifies the task of conventional crawling. The basic Fetcher 16 requests an address from the Dispatcher 14, collects any information available at the address, and sends the collected information to the Data Store 12. Optionally, the Fetcher 16 is capable of requesting and collecting information from more than one address. This capability reduces the number of address requests to and responses from the Dispatcher 14. The information in each packet sent to the Data Store 12 can be from a single address or multiple addresses. Optionally, the Fetcher 16 can compress the information sent to the Data Store 12 to minimize bandwidth utilization. Optionally, the Fetcher 16 can receive the top address for a site on the network, such as an Internet domain name, and scan through all of the pages of the site.

The present invention contemplates at least three possible types of Fetchers 16, a Global Fetcher 16a, a Community Fetcher 16b, and a Deployed Fetcher 16c.

A Global Fetcher 16a resides anywhere on the network and receives addresses from the Central Dispatcher 14a, as in FIG. 1, or a Deployed Dispatcher 14b, as in FIG. 2. A Global Fetcher 16a may be located in a particular geographic region so that it may collect data more efficiently from sites that are more likely to be physically closer. Typically, the Global Fetcher 16a runs on a computer that is dedicated to the fetching task.

Figure 4:
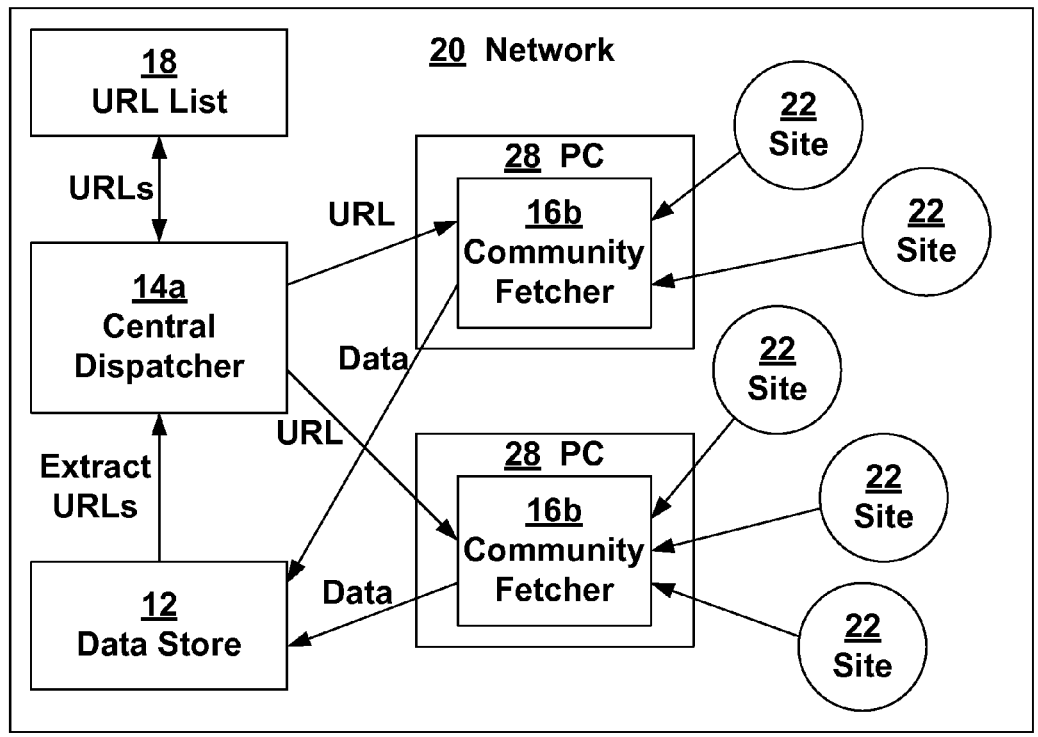
FIG. 4 illustrates an implementation with Community Fetchers.

The Community Fetcher 16b resides on a private personal computer 28 or similar product that has relatively continuous access to the network 20, as shown in FIG. 4. The Community Fetcher 16b only collects textual information from a site, that is, no images or media files are collected. The amount of data sent to the Data Store 12 is much smaller than the amount of information fetched from the site 22, so the communication behavior of the Community Fetcher 16b fits today's most typical asynchronous Internet connection models where the download bandwidth is much larger than the upload bandwidth. The Community Fetcher 16b produces relatively little network traffic as compared to traditional web browsing, which typically involves downloading larger media files, such as images and videos. As a consequence, the Community Fetcher 16b can run in the background so that its activities do not noticeably affect the operation of the computer 28. This leads to one implementation of the present invention, that of using multitudes of volunteers, each running a Community Fetcher 16b. Also, with an intuitive user interface embedded into the Community Fetcher 16b, the community can identify sites to be collected that would otherwise remain undiscoverable by automated methods.

A Deployed Fetcher 16c is resident on a dedicated resource within an NHSP 24 (e.g., in a separate Virtual Private Server, VPS), as in FIG. 3. The Deployed Fetcher 16c can be configured to only request addresses of the NHSP 24 that it is deployed to, either from the Central Dispatcher 14a or a local Deployed Dispatcher 14b, if there is one.

Each type of Fetcher 16 has its advantages. (1) The processors on which the Deployed Fetcher 16c and, optionally, the Global Fetcher 16a run are dedicated to the information collecting process, as opposed to the Community Fetcher 16b that runs in background as a low priority task. (2) With the Deployed Fetcher 16c, the information collecting process takes place on the local network of the NHSP 24, so the high bandwidth of the NHSP's internal network can be exploited, while sparing its valuable incoming and outgoing bandwidth. (3) If the internal bandwidth of the NHSP 24 is greater than the processing speed of a Deployed Fetcher 16c, it is possible to invoke additional Deployed Fetchers 16c on dedicated VPSs to further increase the overall information collecting speed. (4) The number of Community Fetchers 16b can be huge compared to the number of Global Fetchers 16a and Deployed Fetchers 16c.

With the method of the present invention, the information collecting components of the system can be scaled up to a global scale, while keeping the system intelligence centralized. In other words, the task of collecting information is pushed out to the network, while the task of information processing is kept in a central location. This enables the system to constantly monitor the structure of the network. It also eliminates the need for the data-collecting entities to be equipped with enough intelligence to enable them to avoid processing unwanted structures of a network, such as crawler traps.

Moreover, since the task of a Fetcher 16 is kept to a minimum, the Community Fetcher 16c can be utilized to further increase the productivity of the system. Any PC owner can install this type of data-fetcher onto his or her computer 28 in order to perform data-fetching tasks.

Thus it has been shown and described a method for compiling a database through distributed collecting of information that satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A method for collecting data from sites having addresses on a network comprising the steps of:
   (a) providing a plurality of data fetchers, each of said data fetchers residing on a different volunteered private personal computer that is not dedicated to fetching;
   (b) providing a central address dispatcher that maintains a list of site addresses;
   (c) providing at least one deployed address dispatcher that maintains a list of site addresses;
   (d) said each of said data fetchers sending a request for a site address to one of said address dispatchers, receiving said site address, retrieving data from said site at said site address, and sending said data to a data store;
   (e) said central address dispatcher obtaining new site addresses for said central address dispatcher list extracted from said data sent to said data store;
   (f) said at least one deployed address dispatcher obtaining new site addresses for said at least one deployed address dispatcher list from a network hosting service provider; and
   (g) synchronizing said central address dispatcher list and said at least one deployed address dispatcher list to avoid duplicate site addresses.

2. The method of claim 1 wherein said at least one deployed dispatcher resides in said network hosting service provider.

3. The method of claim 1 wherein said plurality of data fetchers is a multitude of data fetchers.

4. A system for collecting data from sites having addresses on a network comprising:
   (a) a plurality of volunteered private personal computers not dedicated to fetching and operationally connected to said network, each of said volunteered private personal computers running a data fetcher;
   (b) a central address dispatcher operationally connected to said network that maintains a list of site addresses;
   (c) at least one deployed address dispatcher operationally connect to said network that maintains a list of site address; and
   (d) a data store operationally connected to said network;
   (e) whereby (1) said data fetcher sends a request for a site address to one of said address dispatchers though said network; (2) said one of said address dispatchers sends a site address to said data fetcher through said network, (3) said data fetcher retrieves data from said site at said site address through said network; (4) said data fetcher sends said data to said data store through said network; (5) said central address dispatcher obtains new site addresses for said central address dispatcher list extracted from said data sent to said data store; (6) said at least one deployed address dispatcher obtains new site addresses for said at least one deployed address dispatcher list from a network hosting service provider; and (7) said central address dispatcher list and said at least one deployed address dispatcher list are synchronized to avoid duplicate site addresses.

5. The system of claim 4 wherein said at least one deployed dispatcher resides in said network hosting service provider.

6. The system of claim 4 wherein said plurality of volunteered private personal computers is a multitude of volunteered private personal computers.

* * * * *